United States Patent [19]
Forkner

[11] 3,878,308
[45] Apr. 15, 1975

[54] COCONUT TREATMENT PROCESS
[75] Inventor: John H. Forkner, Fresno, Calif.
[73] Assignee: The Pillsbury Company, Minneapolis, Minn.
[22] Filed: Sept. 18, 1973
[21] Appl. No.: 398,563

[52] U.S. Cl................................ 426/323; 426/207
[51] Int. Cl............................ A23l 1/00; A23l 1/36
[58] Field of Search.................... 426/205, 207, 323

[56] References Cited
UNITED STATES PATENTS
331,559   12/1885   Senn .................................. 426/205
FOREIGN PATENTS OR APPLICATIONS
557,966   5/1958   Canada ............................... 426/207

*Primary Examiner*—A. Louis Monacell
*Assistant Examiner*—J. M. Hunter
*Attorney, Agent, or Firm*—Flehr, Hohbach, Test, Albritton & Herbert

[57] ABSTRACT

Process for the treatment of coconut meat using acid solution to alter its properties, particularly to tenderize. Batches of the coconut are immersed in acid solution and held at ambient temperatures, during which time the coconut may be transported and/or stored. After such holding the coconut is processed by acid treatment at an elevated temperature to obtain the properties desired.

6 Claims, 1 Drawing Figure

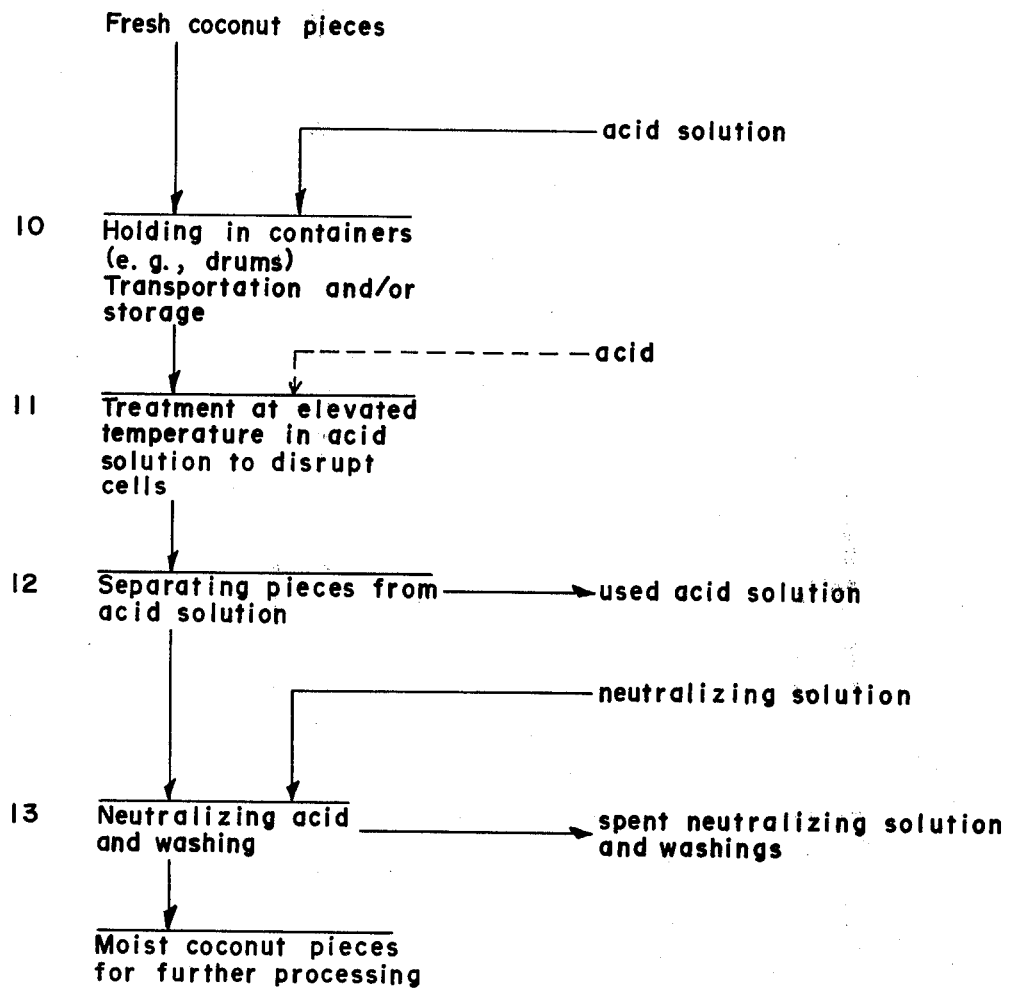

COCONUT TREATMENT PROCESS

REFERENCE TO RELATED APPLICATIONS

Reference is made to copending U.S. Applications Ser. Nos. 173,106 filed Aug. 19, 1971, now U.S. Pat. No. 3,846,562, Ser. No. 335,834 filed Feb. 26, 1973 and Ser. No. 335,688 filed Feb. 26, 1973 disclosing processes for the treatment of coconut meat.

BACKGROUND OF THE INVENTION

This invention relates generally to processes for treatment of fresh coconut meat for the production of coconut material suitable for a variety of purposes. The abovementioned copending U.S. applications disclose processes in which coconut meat is treated with acid solution at temperatures of the order of from 180° to 212°F. over periods ranging from 5 to 60 minutes, whereby new properties are imparted. Normally the cells of coconut meat are rod-like and disposed in close parallel juxtaposition. The procesing serves to disrupt the normal cells and to loosen the bonds between adjacent cells, with the result that the meat is tenderized and is made capable of absorbing various other edible food materials, such as sugar syrup or sugar based materials. In carrying out such processes certain losses occur which materially add to the processing cost of the products produced. Particularly during acid treatment of the pieces at an elevated temperature, and assuming that the treatment is extended for periods of the order of 20 minutes or more to obtain the desired degree of tenderizing, some physical disintegration of the pieces occurs resulting in finely divided material being dispersed in the solution. In further processing after termination of the acid treatment, involving for example separation of the solution from the treated pieces, neutralization of the remaining acid by immersing the pieces in an alkaline solution and then removing the alkaline solution with washing of the pieces, such fines are lost in the removed treatment liquids. Thus it has been found that when the treatment period is of the order of, say, 30 minutes, the losses may amount to as much as 30% of the original coconut material.

In addition to the foregoing it has been found that batches of fresh coconut meat pieces, when stored preparatory to processing, are subject to deterioration, due to enzymatic activity and mold formation. The fat content of the coconut may be affected and may produce objectionable rancidity. Mold formation may seriously affect the quality and flavor of the final product. In general any holding of the material preparatory to processing, such as may be necessary or desirable for transportation and/or storage for efficient plant operation, may seriously affect the quality of the finished products, and may make them unsalable. In this connection it may be noted that in tropical countries where the coconuts are harvested the ambient atmospheric temperatures are such that enzymatic activity and mold formation tend to be relatively rapid. For example, coconut held in the shelled and peeled state for more than 4 hours is considered unsuitable for manufacture of ordinary desiccated coconut because of microbiological growth and incipient rancidity.

SUMMARY OF THE INVENTION

It is an object of the present invention to provide a coconut treatment process making use of acid solution, which overcomes the difficulties referred to above.

Another object is to provide a coconut treatment process which reduces losses to a minimum.

Another object is to provide a process which avoids any deterioration or impairment of the fresh coconut meat during holding preceeding processing at an elevated temperature, including deterioration due to enzymatic activity and mold formation.

Another object is to provide a process which makes possible attainment of a desired tenderizing in a relatively short period of processing time.

Another object is to provide a new overall process for the treatment of coconut which involves a holding period during which time the meat may be transported and/or stored preparatory to processing at a hgher temperature, and subsequent treatment at an elevated temperature in an acid solution, the treatment in both phases of the process cooperating to produce the desired tenderizing effect with a minimum amount of loss.

In general the present process involves separation of fresh coconut meat from the shell and skin material, and then introducing the material in piece form into containers, together with an acid solution (e.g., 0.2 of HCl, pH 2.5) whereby the pieces are immersed in the solution. The material can then be held for periods of the order of 10 days or more, during which time it may be transported to the processing plant and stored before further processing. The acid solution is one which will inhibit any substantial amount of enzymatic activity or mold formation. During the holding period the acid solution penetrates into the interiors of the pieces. After the holding period the pieces are treated in an acid solution (e.g., 1% HCl) at an elevated temperature (e.g., 212°F.) for relatively short periods of time of the order of 1 ½ to 15 minutes, to produce the desired degree of tenderizing. Acid retained by the pieces can then be neutralized by application of a neutralizing solution, followed by removal of the solution and washing. The resulting moist tenderized coconut pieces can then be processed in various ways to make various products.

Additional objects and features of the invention will appear from the following description in which the preferred embodiment has been set forth in detail in conjunction with the accompanying drawing.

BRIEF DESCRIPTION OF THE DRAWING

The single FIGURE is a flow diagram illustrating one manner of carrying out the process.

DESCRIPTION OF THE PREFERRED EMBODIMENT

The process preferably makes use of fresh coconut pieces as the source material. Such pieces may be dices ranging in size from about ⅛ by ⅛ by ⅛ inches to about ½ by ½ by the natural thickness of the meat. Also, they may be elongated pieces like slices or ribbons ranging in length from about ¼ to 4 inches, from ⅛ to ⅝ inches thick, and from ¼ to ¾ inches in width. These pieces should be free of shell and skin material. They can be produced near the harvesting area, and may involve hand and/or machine operations. Shortly after the pieces have been obtained from the fresh coconuts, and before there has been sufficient holding time to promote any deterioration or spoilage, the pieces are introduced into containers of suitable size. For example, the containers may be barrels or drums of metal, plastic or laminate, ranging from 50 to 100 gallons volumetric capacity. Acid solution is then introduced into the drums to a level which covers the coconut. The drums are then held for varying periods of time which may range from 6 hours to several days or more, during which time the drums can be transported to a processing plant. In the drawing the holding in containers while immersed in the acid solution is indicated in step 10. If no transport is involved, this holding or soaking step may take place in suitable storage within the production plant.

The acid solution should be of such character and in such concentration as to inhibit enzymatic activity during the holding period and while the material is at ambient atmospheric temperatures such as prevail in tropical climates. Also it is desirable for this solution to be of the same character as that required in subsequent processing at an elevated temperature.

When it is desired to complete the process at the processing plant, the contents of the containers are delivered into a suitable processing vessel provided with heating means. The pH of the solution at this time should be within certain specified limits. Thus the pH of the solution for subsequent processing may range from 0.6 to 2, pH range of from 0.9 to 1.3 being preferred. If necessary some additional acid can be added to adjust the pH to the desired value. The batch of material is then heated to a temperature of the order of from 180° to 212°F., and held at that temperature for a sufficient period of time to secure the desired cell disruption and tenderizing. In general, this step 11 can be relatively short compared with the time required for similar acid treatment where the coconut has not been subjected to holding in step 10. Following step 11 the treated pieces of coconut are removed from the acid solution. This can be carried out by draining the solution from the mass of coconut in the vessel used for step 11. Generally it is desirable to neutralize acid contained in the pieces. This can be carried out in step 13 by immersing and holding the pieces in a neutralizing solution, such as a solution of sodium bicarbonate. After such immersion the alkaline solution can be removed and the pieces washed with fresh water.

Instead of proceeding as just described the entire batch while within the treatment vessel at the end of step 11 may be neutralized by the addition of a suitable cold alkaline solution like sodium bicarbonate, and after a holding period to complete neutralization, the liquid drained off and the pieces subjected to washing with fresh water. The product thereby produced is moist coconut meat which is relatively tender compared to the source coconut. It has been shown by microscopic examination that the cells of the product produced are disrupted, with loosening of the bonds between cells. This serves to tenderize the meat whereby eating properties are improved, and in addition it makes the material absorbent in that it is receptive to being impregnated with various materials, such as sugar syrup and sugar based materials.

The washing operations referred to above may be omitted if the residual salt (NaCl) is not objectionable.

As indicated in the flow sheet the moist pieces produced can be subjected to further processing for producing a variety of products. Processing may include for example drying the pieces to produce a dry edible product, impregnation of such pieces with various materials including confections and sugar syrup, disintegration of the pieces to form a moist paste, drying of such a moist paste to produce a dry powdered product, and incorporating such disintegrated material in various sugar based products including pastes, jams, jellies, marmalades, icings, frostings and the like, to thicken and stabilize the same.

Assuming that the process is carried out as indicated in the flow diagram, the liquor removed in the step 12 not only contains residual acid, but in addition it includes some fat together with other materials — sugars, proteins, minerals, etc. which are removed from the meat in step 11. This liquor can be treated by suitable methods, such as centrifuging, for removal of the fat.

As previously stated, the acid solution used in step 10 should be one which is capable of inhibiting enzymatic activity and mold formation during the holding period, which may extend for several days. Also it preferably is the same acid solution that is used in the subsequent step 11. Hydrochloric acid solution has been found effective and is preferred. As used in step 10 the solution may contain from 1/5 to 1% hydrochloric acid to provide a hydrogen ion concentration ranging from pH 2.5 to 0.9. Within this pH range the acid functions to inhibit enzymatic activity and mold formation at ambient atmospheric temperatures, and in addition it penetrates into the interiors of the pieces, and thus preconditions the pieces for the subsequent step 11.

While hydrochloric acid has been found to be effective any other physiologically acceptable inorganic acids like sulfuric or phosphoric can be used in step 10, provided they do not injure the coconut or cause objectionable residues that are difficult to remove. Organic acids like lactic, tartaric, citric, malic and fumaric have been found to be mildly effective but they are not deemed desirable because of the relatively large amount of acid required to provide the desired pH value and the expense involved.

During the holding period of step 10, penetration of acid into the interiors of the pieces is accompanied by some diffusion of liquid from the pieces into the acid solution. However it has been found that this does not cause any appreciable change in the pH of the solution, and therefore the effectiveness of the solution remains throughout the holding period.

At the time a batch of material from step 10 is being subjected to the step 11 at an elevated temperature, the pH of the acid solution should be within the limits of 2.0 to 0.6. Preferably step 11 is carried out at boiling temperature, though as previously indicated the temperature may range from 180° to 212°F. The time period at the elevated temperature of treatment in step 11 can be relatively short, of the order of 1.5 to 15 minutes. In general under comparable treatement conditions in step 11, the time period of treatment can be about one third that which would be required for equivalent results, if the coconut had not been subjected to step 10.

Acid solutions that are effective for step 10 over the holding periods being employed may be too weak for obtaining the desired tenderizing effect in step 11 over a short cooking time. Thus when using weak acid solutionss (e.g., 0.2 to 0.6% HCl) it is desirable to add sufficient acid to increase the concentration in the range of from ⅛ to 1% (abut 1% preferred), for the cooking step 11.

As indicated above, both acid concentrations and holding time in step 10 are factors determining the cooking time required in step 11. Other factors being the same, a decrease in the acid concentration in step 10 requires an increase in cooking time. While a 0.2% solution of HCl is effective for holding periods of several days, a cooking time at that concentration and at 212°F. of 1 hour does not result in the desired degree of tenderness. However when the acid concentrate after holding in step 10 is increased to 1%, the cooking time at 212°F. is about 7 to 10 minutes for effective tenderizing. By using a 1% solution of HCl in step 10, with a holding time of 16 hours or more, the cooking time at 212°f. is reduced to 1 ½ to 2 minutes, without acid addition.

It is generally deemed desirable to use a relatively weak acid solution in step 10 to minimize container deterioration, acid losses by leakage, etc. The preserving action of the weaker acid solutions that may be used in step 10 can be augmented by the presence of a preserving agent like sulfur dioxide ($SO_2$) in small amounts (e.g., 1000 to 2000 ppm). The action of the acid solution and $SO_2$ appears to be synergistic in preventing mold formation or other deterioration of the coconut over long holding periods (e.g., 5 weeks at 75°F. with a 0.2% HCl solution and with an initial $SO_2$ content of about 2000 ppm).

In addition to greatly shortening the time period required in step 11, by making use of the present process it has been found that losses are greatly reduced, having reference particularly to loss in the form of finely divided coconut material. Thus under comparable conditions of temperature and pH, if step 11 is carried out on fresh coconut meat which has not been subjected to holding in step 10, over a treatment period of 30 minutes to obtain a desired degree of tenderizing, the losses in the form of finely divided material resulting in some disintegration of the pieces, may amount to about 30%. However, with the present process, using the coconut pieces after holding in step 10, for a period of about 10 hours, the same degree of tenderness can be obtained by treatment for a period of only about 5 minutes, and the losses are reduced to below 10%.

Examples of the invention are as follows.

EXAMPLE 1

A batch of diced fresh coconut meat weighing 34.5 pounds, and measuring about ¼ by ¼ inch by the natural thickness of the meat, was placed in a container and 40 pounds of 1% hydrochloric acid solution (pH 1.08) added to the container to cover the surface of the coconut. The batch was then held at ambient room temperature, and at regular periods aliquot samples were removed. Each of the aliquot samples (coconut and solution) was then processed by heating to boiling point and simmering for various periods ranging from 24 to 1.5 minutes. The following is a table of the holding times and cooking times for the various samples.

TABLE 1

| Holding time (hours) | Cooking time at boiling (minutes) |
| --- | --- |
| 0 | 24 |
| 1 | 21 |
| 2 | 17 |
| 3 | 21 |
| 4 | 20 |
| 5 | 19 |
| 6 | 15 |
| 7 | 12 |
| 9.5 | 8 |
| 10.5 | 5 |
| 22.5 | 2.5 |
| 30.5 | 3 |
| 47.5 | 3 |
| 143.5 | 1.5 |

At the termination of each of the cooking times shown in the above table, the material was removed from the acid solution, and checked to determine the degree of cell disruption and tenderness imparted by the process. For each of the samples it was found that the degree of tenderness was substantially the same and was suitable for commercial purposes. It was observed that irrespective of the holding time the quality of the product produced was essentially the same. Also it was observed that with all samples the quality was excellent, and the appearance and texture appeared to be the same. Likewise, irrespective of the holding time employed, the dices at the end of the holding period had essentially the same consistency, which was quite similar to the original fresh coconut although it is evident that the longer holding periods made it possible to reduce the time in the boiling acid solution. This was attributed to the fact that with the longer holding times, the pieces were more effectively impregnated with the acid solution.

EXAMPLE 2

This example outlines what is deemed to be a practical commercial procedure. Upon harvesting the coconuts the meat is removed and freed of shell and skin material. The meat is then diced by machine to pieces about ¼ by ¼ inch by the natural thickness of the meat. The pieces are introduced into barrels having clamp type covers. A 1% hydrochloric acid solution is introduced into the barrels to a level covering the pieces, and the barrels closed. The barrels are then shipped to the processing plant where they may be held before processing. The total holding time commencing with introduction of acid solution may be from 16 hours to 6 days. Processing at the plant is carried out as described, with a short cooking time of, say, 3 minutes, after which acid is neutralized by addition of sodium bicarbonate, the batch held for a period of 1 to 2 hours to complete neutralization, and the pieces removed from the liquor and washed. The resulting pieces can be dried to a moisture content of 1% or less. Such a product can be used (i.e., in bakery doughs) without further processing, or may be processed as previously described.

I claim:

1. A process for the treatment of fresh coconut meat that is characterized by aligned rod-like cells arranged in cell bundles comprising the steps of immersing pieces of fresh coconut in a water solution of a physiologically acceptable acid at a pH value and of a character capable of inhibiting enzymatic activity and mold formation, holding the batch at ambient temperature for a period of time sufficient to cause the acid to penetrate into the interiors of the pieces and to inhibit enzymatic activity and mold formation, and thereafter processing the coconut meat in a water solution of a physiologically acceptable acid at an elevated temperature and at a pH and for a period of time sufficient to disrupt the cells of the meat and loosening of the cells with respect to each other.

2. A process as in claim 1 in which the pH of the acid solution during the holding period is of the order of pH 2.5 to 0.9, and in which the time of treatment at an elevated temperature ranges from 15 to 1.5 minutes, and inversely to the holding time.

3. A process as in claim 2 in which the time of treatment at an elevated temperature ranges from about 15 to 1.5 minutes, for holding times ranging from 6 hours to 143 hours for the first named step.

4. A process as in claim 3 in which the pH at the time of further processing is from 2 to 0.6.

5. A process as in claim 1 in which the acid solution in the first named step is not higher in pH value than that of the solution in the second named step.

6. A process as in claim 1 in which the same acid solution used in the first step is used as the acid solution for the second step.

* * * * *